Patented Nov. 20, 1928.

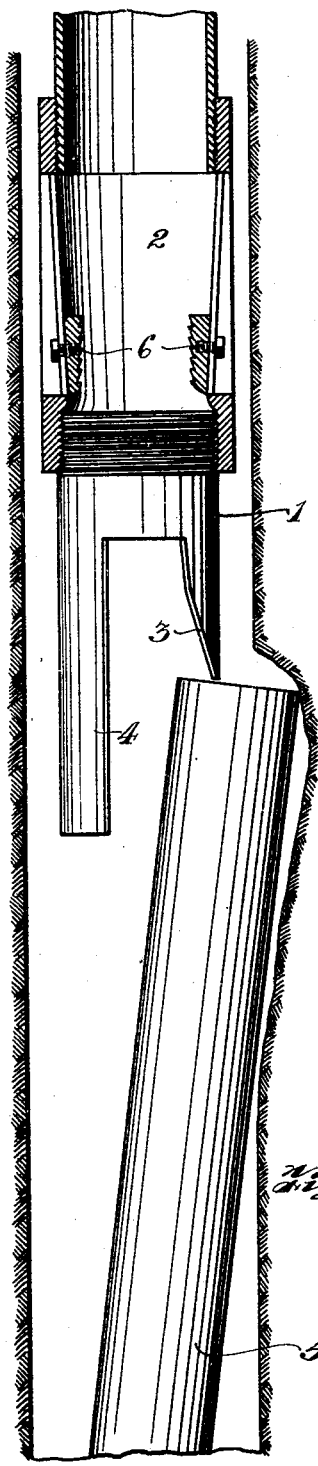
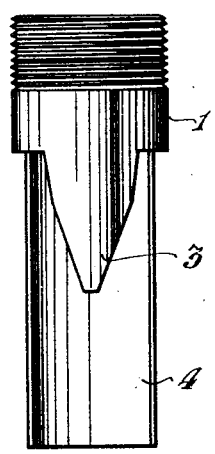
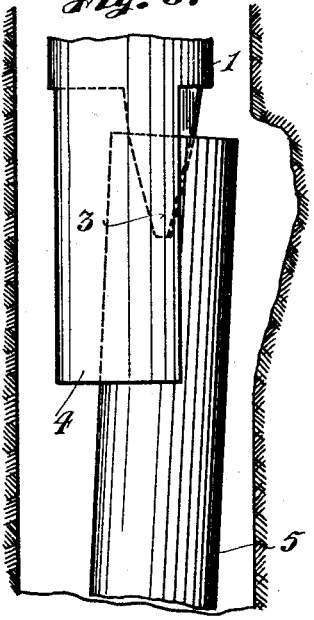
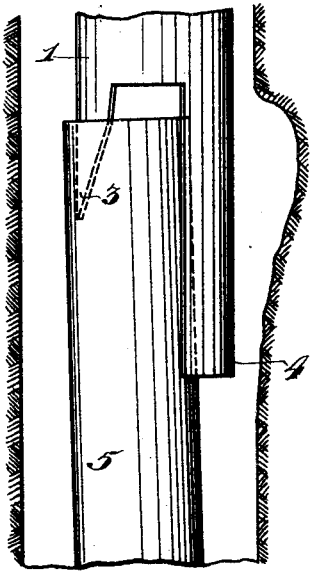
Nov. 20, 1928.                           1,691,972
R. D. HILL ET AL
FISHING TOOL GUIDE
Filed Jan. 31, 1927
Walter W. Foster
Richard D. Hill
INVENTOR.
BY Ernest A. Wood
ATTORNEY.

1,691,972

UNITED STATES PATENT OFFICE.

RICHARD D. HILL AND WALTER W. FOSTER, OF WICHITA FALLS, TEXAS.

FISHING-TOOL GUIDE.

Application filed January 31, 1927. Serial No. 164,914.

This invention relates to fishing tools especially adapted for retrieving lost tool joints, drill collars, pipes and the like in drilling wells, and it refers more particularly to a guide for such tools having for its principal object to provide a means by which the lost object may be first located, and the guide element may be first located, and the guide manipulated in such a manner as to turn the former to a position of advantage, thrust the guide over the tool and urge the latter into the fishing tool proper and withdraw the same from the hole.

It is further the object of the invention to recover sections of pipes and tubing which have been lost in the hole and have assumed a position therein making it difficult to obtain a purchase thereon, and in which regard, the purpose of the invention is to move the lost article to a more central position by which it may be readily grasped.

With these foremost objects in view, the invention has particular reference to certain novel features of construction and its function with respect to the fishing tool, these features being more comprehensively set forth in the following detail description and illustrated in the accompanying drawings wherein:

Figure 1 represents a position of the invention in locating a displaced section of tubing.

Figure 2 is a detail view of the invention.

Figure 3 is an illustration of the manner of manipulating the invention to turn the displaced element to an advantageous position for removal, and Figure 4 is a view showing the displaced element in a position preparatory to removal by the fishing tool.

Continuing now more in detail with the invention, its advantages of construction and operation, it may be mentioned that contrivances and tools such as overshots, hooks and grapples have been heretofore advanced whose purposes are to center the last article, such as drill pipes, drills and the like, relative to the fishing tool for ready removal, and while some of such devices are effective, the invention aims to improve upon the function thereof by establishing a means by which the lost article may be first located especially in case where the latter has receded into a cavity in the hole, as depicted in Figure 1 of the drawings, by properly manipulating the invention, after which further displacement is avoided by a prong or finger entering the pipe, and by a simple turn of the invention, the pipe is caused to assume an upright position relative to the invention, whereupon the latter is slightly elevated to release the prong from the pipe and again lowered to completely enclose the upper end of the pipe to enable the latter to be successfully guided into the fishing tool to effect its removal.

The invention is substantially in the form of the tool illustrated in detail in Figure 2, which is composed of a cylindrical body 1, exteriorly threaded near its top by which it may be operatively received in the lower end of a fishing tool 2, as in Figure 1, of well known construction. The body 1 of the invention near its lower or operative end is so formed as to provide depending portions of unequal length, the shorter of which has been hereinbefore referred to as a prong or finger, and designated by the character 3, while the longer of these portions continues downward a short distance and is cut off abruptly at right angles with respect to the longitudinal axis of the body 1. This latter portion is designated by the character 4 and forms a retaining means against which the object 5 rests, after it performs the function of urging the said object 5 to upright position by turning the invention. The prong 3 is formed with deflecting edges in order that there will be no difficulty in locating the object and inserting it as in Figures 1 and 3.

In following out the figures illustrating different steps in accomplishing the removal of a pipe lost in the well; Figure 1 represents the first step in "feeling out" the position of the pipe. The guide is first manipulated and turned to and fro until the prong 3 finds its way into the pipe. The guide is then lowered as in Figure 3 and again turned, causing the longer portion 4 to engage behind the pipe, urging the same outward to a position shown in Figure 4, whereupon a slight upward movement of the guide will release the prong 3, and permit the pipe to fall against said portion 4, and the guide is again lowered to completely enclose the pipe 5, such lowering action being continued until the pipe finds its way into the fishing tool 2, to be engaged by its teeth 6. The pipe 5 is then withdrawn without difficulty from the hole.

By the provision of a locating prong or finger such as the member 3, and a member such as 4 of greater length to co-operate with the finger in straightening the pipe 5, the great disadvantage not infrequently encountered in fishing jobs, of driving the lost tool further into the side of the bore is avoided, and by simple manipulation of the guide a thorough and quick fishing job may be accomplished without difficulty.

What is claimed is:

An article of the character described for association with a fishing tool, comprising a cylindrical body arranged for mounting upon the lower end of said fishing tool and having its lower end slotted to define a pair of opposed parallel prongs, one of which is of greater length and width than the other, the shorter of said prongs being spear-shaped whereby to engage within an object and bring the latter against the longest of said prongs preparatory to raising said fishing tool to enable said object to enter the latter between said prongs for engagement by said fishing tool.

In testimony whereof we affix our signatures.

RICHARD D. HILL.
WALTER W. FOSTER.